United States Patent
Temme et al.

(10) Patent No.: US 7,255,897 B2
(45) Date of Patent: Aug. 14, 2007

(54) USE OF AQUEOUS POLYURETHANE DISPERSIONS IS FORMULATIONS FOR SPORTS FLOOR COVERINGS

(75) Inventors: Werner Temme, Bietingen (DE); Ralph Bergs, Gottmadingen (DE); Hans Haberle, Gottmadingen (DE); Alois Maier, Engelsberg (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 09/768,274

(22) Filed: Jan. 25, 2001

(65) Prior Publication Data

US 2002/0004553 A1    Jan. 10, 2002

Related U.S. Application Data

(63) Continuation of application No. PCT/EP99/05384, filed on Jul. 27, 1999.

(30) Foreign Application Priority Data

Jul. 28, 1998    (DE) ................................ 198 33 819

(51) Int. Cl.
*B05D 1/02* (2006.01)
*B05D 3/02* (2006.01)
*B05D 5/00* (2006.01)
*B05D 7/00* (2006.01)
*B28B 19/00* (2006.01)

(52) U.S. Cl. .................... 427/385.5; 52/403.1; 156/60; 156/330.9; 156/331.4; 156/331.7; 427/372.2; 427/393; 427/393.5; 427/427.4; 427/427.6

(58) Field of Classification Search ............. 427/372.2, 427/385.5
See application file for complete search history.

(56) References Cited

U.S. PATENT DOCUMENTS

| 4,408,008 A | * | 10/1983 | Markusch .................... 524/591 |
| 4,795,760 A | | 1/1989 | Lucke |
| 4,871,792 A | | 10/1989 | Lucke |
| 5,137,967 A | | 8/1992 | Brown ........................ 524/840 |
| 5,912,298 A | * | 6/1999 | Gomi et al. ................. 524/591 |
| 5,959,027 A | * | 9/1999 | Jakubowski et al. ........ 524/839 |
| 6,218,500 B1 | * | 4/2001 | Keute et al. |

FOREIGN PATENT DOCUMENTS

| DE | 26 00 469 A1 | 7/1977 |
| DE | 2623534 | 12/1977 |
| DE | 3534165 | 3/1987 |
| DE | 38 35 832 A1 | 4/1990 |
| DE | 38 39 986 C2 | 5/1990 |
| DE | 196 34 902 A1 | 3/1998 |

* cited by examiner

*Primary Examiner*—Patrick Niland
(74) *Attorney, Agent, or Firm*—The Nath Law Group; Jerald L. Meyer

(57) ABSTRACT

The invention relates to the use of aqueous, isocyanate-free, polyurethane dispersions with a solid content of $\geq 30$ wt. % and a solvent content of $\leq 10$ wt. % in sports floor coverings. The inventive polyurethane dispersions are particularly suitable for use as bonding agents for elastic coatings, spray coatings or flow coatings on elastic or rigid undersurfaces, adhesion promoters or primary coatings, fillers for sealing pores, adhesives for gluing pre-fabricated plastic coatings or for sealing sports floor coverings. The inventive polyurethane dispersions are environmentally friendly and easy to manufacture. They are also partly characterized by improved product features, e.g. mechanical properties, UV resistance and color stability, with respect to the corresponding sports floor coverings.

20 Claims, No Drawings

USE OF AQUEOUS POLYURETHANE DISPERSIONS IS FORMULATIONS FOR SPORTS FLOOR COVERINGS

This application is a Continuation Application of International Application PCT/EP99/05384 filed on Jul. 27, 1999 the entire contents of which are hereby incorporated in their entirety.

The present invention relates to the use of aqueous polyurethane dispersions in formulations for sports floor coverings.

According to the prior art, polyurethane liquid synthetics are commonly employed in the production of athletic track flooring, school sports facilities, multi-purpose sports floor coverings, tennis courts or ball game courts, and elastic layers for under artificial lawns, playgrounds, walking paths, smaller play areas, gymnasiums, indoor field and track gymnasiums and multi-purpose gymnasiums. Depending on the specific requirements, water-permeable or water-impermeable floor coverings may be constructed.

Polyurethane based sports floor coverings for outdoor and indoor areas may be produced on various surfaces such as asphalt, cemented undersurfaces, wood, and wood composition floors. Specifically, these are coating superstructures consisting of polyurethane prepolymers with free isocyanate groups that may be cured either as a moisture curable single-component formulation or as a two-component formulation based on a polyol and/or amine in a mixture of a defined ratio.

In particular, the following products, more closely described below, serve as components within the formulations used as sports floor coverings:
1) bonding agents for elastic layers
2) adhesion promoters and primary coatings
3) spray coatings
4) flow coatings
5) fillers
6) adhesives
7) sealants 1) Bonding Agents for Elastic Layers As a rule, these are polyurethane prepolymers of polyfunctional polyalcohols (e.g. polyethers and/or polyester alcohols) and polyfunctional isocyanates (e.g. MDI, TDI, IPDI, HDI). Generally, they are moisture curable, i.e. curable while exposed to humidity forming urea bridges into more or less elastic films. Most of all, bonding agents for bonding rubber granulates are of particular interest in the production of sports floor coverings. For the basic layers, primarily black recycling granulate or fibers are used, and colored EPDM granulate is preferably used for visible surfaces.

For elastic layers, distinctions are made among the following systems:
- rubber granulate or rubber fiber coatings in the broadest sense of the word, produced out of, for example, styrene butadiene rubber (R) granulate, ethylene-propylene diene copolymer (EPDM) granulate, ethylenevinyl acetate copolymer (EVA) granulate, or recycling granulate of a grain size of 0.5 to 50 mm or fibers of a length of 0.1 to 50 mm. These coatings are used as surfaces for ball game facilities, school gymnasiums, athletic grounds or tennis court coverings, or as non-visible, elastic layers underneath water permeable or water impermeable sports floor coverings or artificial lawn coverings.
- Rubber granulate chip coverings produced from e.g. SBR, EPDM, EVA, or recycling granulates with grain sizes of 0.5 to 50 mm or fibers of a length of 0-1 to 50 mm as well as mineral additives of a grain size of 1 to 20 mm. These coatings are used above all as elastic layers to support artificial lawns or walkway coverings.
- Coverings made of other granulated materials such as cork, PVC, polyethylene, PU foam, composite foam laminate, or fibers thereof.
- Combination coverings out of recycling and synthetically produced granulates or fibers.
- Granulate coverings with UV-resistant sealing.

2) Adhesion Promoters and Primary Coatings

In order to achieve sufficient adhesion of sports floor coverings to surfaces such as asphalt, cemented surfaces, wood or composite floors, it is often necessary to apply an adhesion promoter or primary coat before constructing the sports floor covering. As with bonding agents, these adhesion promoters generally are moisture curable polyurethane prepolymers containing as a rule considerable quantities of organic solvents for better penetration into the undersurface. Also two-component adhesion promoters or primary coatings are used with polyisocyanate or prepolymers curing in a predetermined ratio within a polyol based formulation. Also solvent-free adhesion promoters or primers are known.

3) Spray Coatings

Polyurethane coatings filled with additives (e.g. finely ground rubber granulate) may generally be applied by spraying onto asphalt, but preferably onto elastic surfaces such as rubber granulate mats bonded by polyurethane bonding agents. This generally preserves water permeable coverings as well as coverings of structures made water impermeable by prior sealing of the undersurface. Structural spray coatings based both on one-component as well as two-component formulations are commonly moisture curable, and in order to guarantee that they are readily sprayed, contain considerable quantities of organic solvents. Polyurethane spray coatings currently on the market also contain fillers, pigments, catalysts, and thixotropic agents, in addition to the reactive substances and solvents described above.

As to spray coatings, distinctions are made among the following systems:
- Direct spraying of an unfilled spray coat onto a previously defined elastic layer, or one produced on location, or even onto a prefabricated elastic layer or other surface (e.g. asphalt, cement bonded surfaces, wood); perhaps followed by defining the surface with an elastic granulate (e.g. EPDM) or dusting with an excess.
- Spraying of a spray coat filled with 5 to 80 weight percent of structural fillers (such as SBR, EPDM, or PVC granulate, PU chippings) onto [see above] a previously defined elastic layer produced on site (using common installation tools) or also onto a prefabricated elastic layer or other surface (e.g. asphalt, cement bonded surfaces, wood). The floor covering created in this manner is generally useful as a water permeable sports floor covering for athletic grounds, school sports facilities, and ball game facilities.
- Applying a spray coat filled with 5 to 80 weight percent with structural filler material (such as SBR, EPDM, or PVC granulate, PU chippings) onto the surface of the above defined elastic layer, produced on location, or onto a prefabricated elastic layer sealed with a filler to close pores. This creates a water impermeable sports floor covering that may be used for athletic grounds, school sports facilities, and ball game facilities.

4) Flow Coatings

Flow coatings may be applied, perhaps following the application of an adhesion promoter, directly onto asphalt, cement bonded surfaces, wood, composition floors, passable polyurethane coatings, or sealed rubber granulate mats. The surface may later be sealed for protection or also be dusted with excess rubber granulate (while it is still liquid).

The prior art reveals two-component curing polyurethane coverings of which one component usually consists of one or more higher alcohols (e.g. polyether alcohols and/or polyester alcohols), filler materials, pigments, catalysts, and additives to regulate de-aeration, flow, and spreading. The isocyanate component generally is an aromatic polyurethane prepolymer. As a rule, polyurethane flow coatings are formulated to be solvent-free, occasionally, however, they contain softeners.

As to flow coatings, distinctions are made among the following systems:

direct application of the flow coating onto an elastic layer that is previously sealed with filler material, as defined above, produced on location (using common installation tools), or even prefabricated. Possibly, the surface may subsequently be dusted with an elastic granulate (e.g. EPDM) (with a defined amount or with an excess amount); furthermore, it is possible to protect the surface (smooth or dusted) with a pigmented or unpigmented polyurethane based sealant. These water impermeable methods of coating are widely used for spike-proof athletic grounds or multi-purpose sports facilities, but also for gymnasium floorings.

The polyurethane covering may be directly applied to an elastic layer which is sealed with filler material and previously defined, after mixing with 5 to 80 weight percent of rubber granulate of a granular size of 0.1 to 10 mm by, for example, rollers, spray-blowers, or squeegee. It is possible to subsequently seal the surface.

One-layer flow applications with smooth, sealed surfaces, or surfaces structured by dusting with granulate. Such systems are used primarily for ball game facilities or tennis courts.

Multilayer flow applications with smooth, sealed surfaces, or surfaces structured by dusting with granulate, which under certain circumstances may also be sealed. Each layer may, but need not, be dusted with a structural filler material. Such systems are used for athletic grounds (race tracks), multifunctional sports facilities, but also for multifunctional gymnasiums and indoor track facilities.

5) Fillers

Fillers permits a seal of prefabricated rubber granulate coverings or coverings produced on location, or of other surfaces for subsequent applications of flow coatings or for construction of water impermeable structural spray coatings. Fillers currently on the market are based on two components. The A-component generally consists of one or polyfunctional polyalcohols (e.g. polyether alcohols and/or polyester alcohols), fillers, pigments, catalysts, and thixotropic agents; the B-component is a polyisocyanate or a polyurethane prepolymer based on an aromatic isocyanate. As a rule, polyurethane fillers are formulated to be solvent-free.

6) Adhesives

In the production of sports floor coverings, adhesives serve most of all to glue elastic mats, e.g. prefabricated rubber granulate mats, onto asphalt and cement bonded undersurfaces. Adhesives may be formulated to be one-component moisture curable or two-component adhesives. In addition to fillers, they also contain adhesion promoters and catalysts, in the two-component case, also polyfunctional polyalcohols (e.g. polyether alcohols and/or polyester alcohols). The isocyanate is of a polyfunctional nature and often represents an aromatic polyurethane prepolymer. Also softening agents or solvents may be components of the formulation.

7) Sealants

In many systems, sealants are applied in the production of sports floor coverings in the last work step to increase the capacity to resistance to wear, weathering resistance, color stability, or chemical stability, or to define surface gloss and skid-resistance. As a rule, sealants are two-component formulations containing considerable quantities of organic solvents as the A-component along with polyalcohols (e.g. polyether alcohols and/or polyester alcohols), matting agents, pigments, and additives for regulating de-aeration, flow, and spreading. The curing component generally consists of modified aliphatic isocyanates.

A disadvantage of all of these formulation components based on polyurethane is the fact that these products contain isocyanate and that a part of them contain large quantities of solvents so that these components pose a considerable threat to health and to the environment, wherefore the processing of which requires special measures to protect the environment as well as security measures. In addition, these formulations containing isocyanate cure extremely slowly at low temperatures and often achieve a reduced level of desired properties due to side reactions with air humidity.

The object of the present invention is to develop formulation components for sports floor coverings based on polyurethane which avoid the above-named disadvantages of the prior art, being both environmentally compatible as well as more readily processed. This object was solved according to the invention by using aqueous, isocyanate-free polyurethane dispersions having solid matter contents of not less than 30 weight percent and solvent contents of not greater than 10 weight percent in formulations for sports floor coverings. It was surprisingly shown that these polyurethane dispersions were not only environmentally safer and more readily processed, but moreover partly produced improved product properties in the corresponding sports floor coverings such as, for example, mechanical properties (tensile strength, elongation), UV resistance, as well as color stability. In addition, thicker layers may be applied than with isocyanate containing moisture curable systems, which was not to be expected.

The aqueous, isocyanate-free polyurethane dispersions suggested by the invention have a solid matter content of not less than 30 weight percent, preferably 40 to 70 weight percent, and a solvent content of not greater than 10 weight percent, in particular of less than 5 weight percent. According to a particularly preferred embodiment, corresponding solvent-free polyurethane dispersions are used. According to the application, the term "isocyanate-free" means that the isocyanate content of solvent-free polyurethane dispersions should be less than 0.1%, preferably less than 0.01%. It is particularly preferred that the solvent-free polyurethane dispersion contain no isocyanate at all.

The preferred average particle size of the polyurethane polymer ranges from 100 to 500 nm, preferably from 200 to 400 nm, corresponding data relating to photon correlation spectroscopy (PSC) measurements. The corresponding polyurethane polymer generally has an average molecular mass of 25,000 to 100,000 Daltons. The corresponding data relate to numeric averages ($M_n$) of gel permeation chromatography (GPC) measurements.

Such aqueous polyurethane dispersions are already known, a preferred solvent-free polyurethane dispersion and its production being described in German Patent Application 198 12 751.0. Its production method is characterized in that a) 10 to 50 weight percent of higher molecular polyol component (A) is reacted with (i) with two or more hydroxy groups reactive with polyisocyanates and a molecular mass of 250 to 20,000 Daltons as well as 0.5 to 5 weight percent lower molecular polyol component (A), (ii) with two or more hydroxy groups reactive with polyisocyanates and having a molecular mass of 60 to 250 Daltons with 5 to 25 weight percent of polyisocyanate component (B), consisting of at least one polyisocyanate homolog with two or more aliphatic or aromatic isocyanate groups, in some cases in the presence of a catalyst, to create a polyurethane pre-adduct, then b) reacting the polyurethane pre-adduct of step a) with 0.5 to 5 weight percent of lower molecular and anionic modifiable polyol component (A) (iii) with two or more hydroxy groups reactive with polyisocyanates and one or more carboxy groups inert with respect to polyisocyanates, which in the presence of base may be completely or partially converted into carboxylate groups, to produce the corresponding prepolymer, c) prepolymer of step b) is reacted with 0.25 to 2.5 weight percent of a neutralising component (C) to complete or partial neutralisation of carboxy groups, followed by or simultaneous with d) dispersing neutralised prepolymer of step c) in 10 to 60 weight percent water, which in some cases contains 10 to 70 weight percent of formulation component (F) consisting of filler material, pigments, softeners, fiber materials, and other common additives, following which e) reacting dispersion of step d) with 0.25 to 2.5 weight percent chain extension component (D) consisting of at least one polyamine with one or more amino-groups reactive with polyisocyanate, and f) in some cases, reacting dispersion of step e) with 0.05 to 0.5 weight percent of chain stopping component (E) consisting of at least one monoamine with an amino group reactive with polyisocyanate.

Component (A) (i) consists of at least one higher molecular polyol having two or more hydroxy groups reactive with polyisocyanates and an average molecular mass (numeric average $M_n$) of 250 to 20,000 Daltons, and in particular based on a polyether and/or polyester polyol. Preferably, these are polymeric polyols such as polyalkylene glycols, aliphatic or aromatic polyesters, polycaprolactons, polycarbonates, macromonomers, telechelic, or epoxide resins or mixtures thereof. Polyalkylene glycols are obtained from monomers such as ethylene oxide, porpylene oxide, butylene oxide, tetrahydrofurane by polymerisation in the presence of boron trifluoride or by polyaddition to starter compounds with reactive hydrogen atoms such as water, alcohols, amines, or bisphenol A, whereby also mixtures of monomers may be used simultaneously or in sequence. Polyethylene glycols, polypropylene glycols (e.g. Voranol-types of Dow), mixed polyglycols based on ethylene oxide and propylene oxide as well as polytetramethylene glycols or polytetrahydrofuranes (e.g. polyTHF 2000 of BASF) may be used as appropriate polyalkylene gylcols. Linear and/or difunctional polypropylene glycols are preferred having an average molecular mass (numeric average $M_n$) of 3000 to 4000 Daltons. Aliphatic or aromatic polyester polyols are obtained by polycondensation reactions and/or polyaddition reactions of divalent or polyvalent alcohols and divalent or polyvalent carboxylic acids, carboxylic acid anhydrides, or carboxylic acid esters. For example, condensates based on 1,2-ethanediol or ethylene glycol, 1,4-butanediol or 1,4-butyleneglycol, 1,6-hexanediol or 1,6-hexamethylene glycol, and 2,2-dimethyl-1,3-propanediol or neopentylglycol, as well as 1,6-hexanedioic acid or adipic acid, and 1,3-benzoldicarboxylic acid or isophthalic acid (e.g. Poliolchimica's Bester-types) may be used as suitable aliphatic or aromatic polyesters. Linear or difunctional aliphatic or aromatic polyester-polyols are preferred having an average molecular mass (numeric average $M_n$) of 1,000 to 3,000 Daltons. Likewise, polycaprolactons (e.g. Solvay Interox's Capa-types) and polycarbonates (e.g. Bayer's Desmophen C 200) belong to the group of polyesters. The former are obtained by reacting phosgene or aliphatic or aromatic carbonates such as for example diphenyl carbonate or diethyl carbonate with divalent or polyvalent alcohols. Latter are produced by polyaddition of lactons such as, for example, ε-caprolacton to a starter compound with reactive hydrogen atoms such as water, alcohols, amines, or bisphenol A. Synthetic combinations of polyesters, polycaprolactons and polycarbonates are also possible. Macromonomers, telechelic polymers, or epoxide resins are likewise suitable. The macromonomers and telechelic polymers include polyhydroxyolefins such as, for example, α-ω-dihydroxypolybutadiene, α-β-dihydroxy(meth)acrylic acid ester, α-ω-dihydroxy(meth)acrylic acid ester, or α-ω-dihydroxypolysiloxane. As epoxide resins, derivatives of bisphenol-A diglycid ether (BADGE) are preferred.

Component (A) (ii) thus consists of at least one lower molecular polyol having two or more hydroxy groups reactive with polyisocyanates and a molecular mass of 60 to 250 Daltons. For example, the following may be used as suitable lower molecular polyols: 1,2-ethane diol (ethylene glycol), 1,2-propanediol (1,2-propylene glycol), 1,3-propanediol (1,3-propylene glycol), 1,4-butane diol (1,4-butylene glycol), 1,6-hexanediol (1,6-hexamethylene glycol), 2-methyl-1,3-propanediol (commercially known as MPDiol Glycol® of Arco Chemical), 2,2-dimethyl-1,3-propanediol (neopentylglycol), 1,4-bis-(hydroxymethyl)-cyclohexane (cyclohexanedimethanol), 1,2,3-propanetriol (glycerol), 2-hydroxymethyl-2-methyl-1,3-propanol (trimethylolethane), 2-ethyl-2-hydroxymethyl-1,3-propanediol (trimethylol propane), and 2,2-bis-(hydroxymethyl)-1,3-propanediol (pentaerythritol).

Component (B) thus consists of at least one aliphatic or aromatic polyisocyanate, polyisocyanate derivative, or polyisocyanate homolog with two or more isocyanate groups. Particularly suitable are the polyisocyanates well-known in polyurethane chemistry, or combinations thereof. As examples, the following may be used as suitable aliphatic polyisocyanates: 1,6-diisocyanatohexane (HDI), 1-isocyanato-5-isocyanatomethyl-3,3,5-trimethyl-cyclohexane (IPDI), bis-(4-isocyanatophenyl)-methane ($H_{12}$MDI), 1,3-bis-(1-isocyanato-1-methyl-ethyl)-benzol (m-TMXDI), or technical isomer mixtures of individual aromatic polyisocyanates. As examples of suitable aromatic polyisocyanates, the following may be used: 2,4-diisocyanatotoluene (TDI), bis-(4-isocyanatophenyl)-methane (MDI), and in some cases, the higher homologs thereof (polymeric MDI) or technical isomer mixtures of the individual aromatic polyisocyanates. Furthermore, principally suitable are also what are known as "laquer polyisocyanates" based on bis-(4-isocyanatocyclo-hexyl)-methane ($H_{12}$MDI), 1,6-diisocyanatohexane (HDI), 1-isocyanato-5-isocyanatomethyl-3,3,5-trimethyl-cyclohexane (IPDI). The expression "laquer polyisocyanates" denotes derivatives of these diisocyanates having allophanate, biuret, carbodiimide, isocyanurate, uretdion, urethane groups, for which the residue content of monomeric diisocyanates was reduced to a minimum in accordance with the prior art. In addition, also modified polyisocyanates may be used which are accessible, for example, by hydrophilic modification of "laquer polyisocyanates" based on 1,6-diisocyanatohexane (HDI). Aliphatic polyisocyanates are preferred over aromatic polyisocyanates. Furthermore, polyisocyanates with isocyanate groups of varying reactivity are preferred.

Performing the first reaction step a) is relatively non-critical in view of the reaction conditions. Preferably, formation of the polyurethane pre-adduct occurs in a manner in which component (B) is added or dosed to the mixture of components (A) (i), and in some cases (A) (ii), over a period of several minutes to several hours, or alternatively the mixture of component (A) (i), and in some cases (A) (ii), is added or dosed to component (B) over a period of several minutes to several hours.

The preferred NCO/OH equivalent ratio of components (A) (polyols) and (B) (polyisocyanates) is adjusted to a level of 1.5 to 2.5, however, especially to 1.8 to 2.2. Initiation of the reaction exploits the exothermicity of the polyaddition reaction until the calculated or theoretical NCO content is attained at a temperature between 60° and 120° C., preferably however between 80° and 100° C., stirring under an inert gas atmosphere. The required reaction times are around several hours, and are influenced by reaction parameters such as reactivity of the components, stoichiometry of the components, and temperature.

The reaction of components (A) and (B) in reaction step a) may occur in the presence of a catalyst system typical for polyaddition reactions to polyisocyanates. If needed, these catalysts may be added in quantities of 0.01 to 1 weight percent relative to the reaction initiation. Commonly used catalysts for polyaddition reactions to polyisocyanates are for example, dibutyl tin oxide, dibutyl tin dilaurate (DBTL), triethyl amine, tin (II) octoate, 1,4-diaza-bicyclo [2,2,2] octane (DABCO), 1,4-diaza-bicyclo[3,2,0]-5-nonene (DBN), 1,5-diaza-bicyclo (DBU).

In the subsequent reaction step b), the reaction of the polyurethane pre-adduct of reaction step a) having 0.5 to 5 weight percent of component (A) (iii) to the corresponding prepolymer occurs, whereby preferably finely ground polyol component (A) (iii) with a particulate size of <150 µm is added or dosed to the polyurethane pre-adduct from reaction step a) within a time period of several minutes to several hours.

Component (A) (iii) consists of at least one lower molecular and anionic, modifiable polyol with two or more hydroxy groups reactive with polyisocyanate and one or more carboxy groups inert with respect to polyisocyanate, which may be completely or partially converted in the presence of base into carboxylate groups. As lower molecular and anionic modifiable polyols, 2-hydroxymethyl-3-hydroxypropanoic acid (dimethylol acetic acid), 2-hydroxymethyl-2-methyl-3-hydroxypropanoic acid (dimethylol propionic acid), 2-hydroxymethyl-2-ethyl-3-hydroxypropanoic acid (dimethylol butyric acid), 2-hydroxymethyl-2-propyl-3-hydro acid (dimethylol valeric acid), citric acid, [and] tartaric acid. Bishydroxyalkane carboxylic acids with molecular masses of 100 to 200 Daltons and preferably 2-hydroxymethyl-2-methyl-3-hydroxypropanoic acid (dimethylol propionic acid, commercially known as DMPA® of Mallinckrodt) are preferably used.

Polyaddition reactions to produce such polyurethane prepolymers require high NCO/OH equivalence ratios, in particular, from 1.5 to 2.5, preferably, 1.8 to 2.2. In addition, preferably polyisocyanates with isocyanate groups of varying reactivities are used to obtain narrower molecular mass distributions with reduced lack of uniformity. Accordingly, polyurethane prepolymers with linear structures are preferred, which are composed of difunctional polyol and polyisocyanate components.

Production of prepolymers according to reaction step b) occurs preferably at temperatures between 60° and 120° C., in particular between 80° and 100° C. Polyurethane prepolymer viscosity is relatively low and mostly independent of the structure of the polyol and polyisocyanate components used. An addition of solvents to reduce viscosity or to improve dispersion properties of polyurethane prepolymers is therefore not required. The special structure of prepolymers enables production of products with extraordinarily high solid matter content. Moreover, due to the even distribution of carboxy and/or carboxylate groups over the polyurethane polymer, only minor charge densities are needed for stabilising the corresponding polyurethane dispersions.

Polyurethane prepolymer of reaction step b) is reacted in the subsequent reaction step c) with 0.25 to 2.5 weight percent of a neutralising component (C) to completely or partially neutralise the carboxy groups (direct neutralisation). Neutralisation component (C) is present preferably in such a quantity that the degree of neutralisation relative to free carboxy groups of polyurethane prepolymers is at 70% to 100% equivalence, preferably at 80% to 90% equivalence. During neutralisation, carboxy groups are converted to carboxylate groups, which serve to anionically modify and/or stabilise the polyurethane dispersion. Reaction step c) is performed at a temperature of 40° to 60° C., preferably at approximately 50° C. Alternatively, neutralisation component (C) may be present in the dispersing medium as in reaction step d).

Neutralisation component (C) consists of one or more bases, which serve to completely or partially neutralise the carboxy groups. Tertiary amines such as N,N-dimethylethanol amine, N-methyl-diethanol amine, triethanol amine, N,N-dimethylisopropanol amine, N-methyl-diisopropanolamine, triisopropylamine, N-methyl-morpholine, N-ethylmorpholine, triethylamine, ammonia, or alkali hydroxides such as lithium hydroxide, sodium hydroxide, potassium hydroxide may be used as suitable bases. Preferably, tertiary amines are used, and in particular, triethyl amine.

Neutralised polyurethane prepolymer of reaction step c) is dispersed in the subsequent reaction step d) in 10 to 60 weight percent of water, which, in some cases, [missing predicate of clause] 10 to 70 weight percent of a formulation component (F) consisting of fillers, pigments, softeners, fibrous materials, dispersion promoters, rheologic aids, defoaming agents, adhesion promoters, anti-freezing agents, flame proofing agents, bactericides, fungicides, preservatives, or other polymers and/or polymer dispersions. In dispersion, neutralised polyurethane prepolymer is transformed into the dispersion medium and thereby forms a polyurethane prepolymer dispersion. Neutralised polyurethane prepolymer forms micelles which contain stabilising carboxylate groups on the surface and reactive isocyanate groups on the inside. All cationic counterions to the anionic carboxylate groups are solvated in the dispersion medium. The terms "dispersing" and/or "dispersion" connote that in addition to the dispersed components of micellar structure, also solvated and/or suspended components may be contained. For the transformation of polyurethane prepolymer into the aqueous phase, either polyurethane prepolymer may be stirred into the dispersion medium, or dispersion medium may be stirred into the polyurethane prepolymer. Reaction step d) is performed at a temperature between 30° and 50° C., preferably at approximately 40° C.

There are further alternatives to the methods described above. Reactions steps c) and d) may be summarized in a manner that neutralising component (C) is added to water in that the non-neutralised polyurethane prepolymer according to reaction step d) is dispersed (indirect neutralisation). Prior to dispersion, formulation component (F) according to reaction step d) may be completely or partially stirred into the polyurethane prepolymer as long as this does not interfere with the production method.

In a subsequent reaction step, the polyurethane prepolymer dispersion from reaction step d) is reacted with 0.25 to 2.5 weight percent of chain extending component (D) and, in some cases, in reaction step f) with 0.05 to 0.5 weight percent of chain stopping component (E).

Chain extending component (D) consists of at least one polyamine with two or more amino groups reactive with polyisocyanates. Suitable polyamines include, for example, adipic acid hydrazide, ethylene diamine, diethylene triamine, triethylene tetramine, tetraethylene pentamine, pentaethylene hexamine, dipropylene triamine, hexamethylene diamine, hydrazine, isophorondiamine, N-(2-aminoethyl)-2-aminoethanol, adducts of salts of 2-acrylamido-2-methyl-propane-1-sulfonic acid (AMPS) and ethylene diamine or any combination of these polyamines. Preferably difunctional primary amines are used, 1,2-diaminoethane and/or ethylene diamine, in particular.

Chain stopping component (E) consists of at least one monoamine with an amino group reactive with polyisocyanate. Suitable monoamines include for example ethylamine, diethylamine, n-propylamine, di-n-propylamine, isopropylamine, diisopropylamine, n-butylamine, di-n-butylamine, ethanol amine, diethanol amine, isopropanol amine, diisopropanol amine, morpholine, piperidine, pyrrolidine, or any combination of these polyamines. Preferably, monofunctional primary amines are used, in particular 2-aminopropane and/or isopropylamine.

Chain extending component (D) is used according to a preferred embodiment in such a quantity that the degree of chain extension relative to free isocyanate groups of the polyurethane prepolymer is at 50% to 100% equivalence, preferably at 70% to 80% equivalence. In using chain extending component (D) and chain stopping component (E), these components may be added either in sequence or simultaneously as a mixture of polyurethane prepolymer dispersion of reaction step d). Chain extension of polyurethane prepolymer dispersion leads to build-up of molecular mass within the micelle and to formation of a high molecular mass polyurethane polyurea dispersion. Chain extending component (D) thereby reacts with reactive isocyanate groups much faster than water. Chain stopping in the polyurethane prepolymer dispersion results in a discontinuation of build-up of molecular mass within the micelle and to the formation of a low molecular mass polyurethane polyurea dispersion. Chain stopping component (E) reacts with reactive isocyanate groups much faster than water. Following reaction steps e) and f), any free isocyanate groups still present may be completely consumed in chain extension by reacting with water.

The aqueous, isocyanate-free polyurethane dispersions suggested by the invention may replace all polyurethane based products formulating sports floor coverings. It is possible to formulate these products starting with polyurethane dispersions by dispersion of fillers or pigments and/or mixing with liquid components. Alternatively, an "in-situ formulation" in the production of polyurethane dispersions may be performed directly, i.e. first fillers and pigments and then the polyurethane polymer is dispersed into distilled water. In this manner, fillers may be incorporated into the polyurethane particles and one obtains especially valuable products with low write-offs. Moreover, with in situ formulations of polyurethane dispersions, extraordinarily high solid matter contents are achieved at comparatively low viscosities, which was not possible with a conventional formulation of pure polyurethane dispersions.

The aqueous polyurethane dispersions suggested by this invention are suited in particular as formulation components in the production of sports floor coverings, in particular for the following applications:

1. as bonding agents for elastic layers consisting of rubber granules or fibers, in particular produced from SBR, EPDM, EVA, or recycling granules of the granule size of 0.5 to 50 mm or of fibers of the length of 0.1 to 50 mm. In some cases, these elastic layers may also contain mineral additives of the granular size of 1 to 20 mm.

2. For spray coats on elastic (e.g. rubber granulate mats) or stiff undersurfaces (e.g. asphalt), which in some cases may also contain 5 to 80 weight percent of structural fillers (such as, for example, SBR, EPDM, or PVC granulate, PU chippings).

3. For flow coats on elastic (e.g. rubber granulate mats) or stiff undersurfaces (asphalt or concrete), where application may include one or more layers as well as in some cases dusting of granulate (in particular, EPDM granulate, 1 to 4 mm).

4. As adhesion promoter or primary coat onto the undersurface (such as, for example, asphalt, cement bonded undersurfaces, wood or composition floors) of sports floor coverings.

5. As filler to seal pores of undersurfaces (for example, prefabricated rubber granulate coverings or rubber granulate coverings installed on location) of sports floor coverings for subsequent application of a flow coat or for the construction of water impermeable structural spray coats.

6. As adhesives for gluing prefabricated elastic layers (e.g. prefabricated rubber granulate mats) onto asphalt or cement-bonded undersurfaces of sports floor coverings.

7. For sealing (in some cases, pigmented) sports floor coverings to increase capacity of resistance to wear, weather resistance, color stability, or chemical stability, and/or to pre-set a desired degree of gloss and skid resistance.

By using UV-stabilisers of the type of sterically hindered amines in concentrations of 0.1 to 1.0 weight percent relative to the total mass of the formulation, chalk resistance and permanency of water (warm water of approximately 50° C.) of formulations based on polyurethane dispersions may be significantly increased. This was unambiguously shown in a piece of equipment specially designed for this purpose in an extreme climate (intense UV radiation, increased temperatures, simultaneous rain). A significant improvement was achieved even in conventional coverings (isocyanate-containing) protected in the same manner.

UV stabilisers used include systems of the HALS type (hindered amine light stabiliser), such as, for example, 1,2,2,6,6-pentamethyl-4-piperidinylester of decanedioic acid (HALS I), or 2,2,6,6-tetramethyl-1-isooctyloxy-4-piperidinylester of decanedioic acid (HALS II). Preferably, HALS I types are used. In combination with UV stabilisers of the HALS type, also UV absorbers may be used, such as, for example, substituted hydroxyphenyl benzotriazols, hydroxybenzophenones, hydroxyphenyl-s-triazines, and antioxidants such as substituted 2,6-di-tert-butylphenols.

Depending on the application, the polyurethane dispersions formulated according to the invention may be applied in layers of a total thickness of 0.1 to 50 mm onto elastic or stiff undersurfaces. For this purpose, as a rule, 0.1 to 10.0 kg of formulated polyurethane dispersion are required per $m^2$ of coated surface and per operating cycle. Even though formulated polyurethane dispersions suggested by the invention may be used in one or two component methods, the one-component manifestation is viewed to be preferred due to easier handling.

Moreover, it is also possible to use mixtures of polyurethane dispersions with conventional polymer dispersions as binding material within the formulations for sports floor coverings. These polymer dispersions are aqueous emulsion polymerisates based on ethylene unsaturated monomers such as, for example, (meth)acrylates, styrene, vinylacetate.

In addition to improved working properties as well as its very good environmental aspects, the invention's suggested aqueous polyurethane dispersions also enable the following advantageous product properties in view of the corresponding sports floor coverings:

- mechanical properties (tensile strength, elongation) of product films are contrary to expectations at least equal, generally even clearly better than those of isocyanate containing systems.
- By varying the polyurethane dispersion it is possible to create a broad spectrum of product properties so that also significantly softer coverings are accessible than with the starting materials heretofore.
- All systems have very good UV resistance and color stability so that colored elastic layers which are not overlayered do not need sealing. Conventional systems that are common in the market place are significantly less UV resistant and less weather proof.
- Thicker layers may be applied than in isocyanate-containing moisture curable systems.
- Viscosity is less temperature dependent than is the case with conventional systems.
- Hydrolysis stability, even without later cross-linking, is higher than expected.
- There is unlimited adhesion within the individual layers of the above-mentioned system.
- In comparison to the usual systems, a higher color intensity and reduced tendency to chalk have been noted.
- The formulations for adhesion promoters, flow coats, spray coats, bonding agents, adhesives, and filler material were processed outdoors. Stability, UV resistance, layer adhesion, water-resistance, weather-resistance, etc. were tested, and confirmed the laboratory results.
- In structural spray coats, the drying after each spraying process (approx. two to six hours depending on conditions) is significantly faster than is the case with the usual solvent containing and isocyanate containing structural spray coats (approximately 24 hours). Consequently, surfaces of suitable sizes may readily be covered within one day in two spraying operations. The workman saves an enormous amount of time, which results in lower installation costs. This is particularly significant for smaller surfaces (less than 2000 $m^2$).

The extraordinarily good mechanical properties of the coatings based on polyurethane dispersions allow for conception of new systems with significantly reduced layer thickness (much thinner layers) for indoor and outdoor sports areas.

The following examples are provided to better illustrate the invention.

EXAMPLES FOR PRODUCTION: A.1 THROUGH A.3

Example A.1

Solvent-free Polyurethane Dispersion with High Solid Matter Content Based on Polypropyleneglycol 1000

In a four-necked flask fitted with a stirrer, reflux condenser, thermometer, and nitrogen inlet, a mixture of 100.00 g of polypropylene glycol with an hydroxy number of 112.2 mg KOH·$g^{-1}$ (trade name Voranol P1000 by Dow) and 59.39 g isophorondiisocyanate (trade name Vestanat IPDI of Hüls) was stirred for two hours at 80° to 90° C. under a nitrogen atmosphere.

After addition of 4.50 g finely ground dimethylol propionic acid (trade name DMPA of Mallinckrodt) to the pre adduct, the mixture was stirred again at 80° to 90° C. under nitrogen until a calculated NCO content was obtained (NCO/OH=2.00). The course of the reaction was acidimetrically recorded. Upon completion of the polyaddition reaction, a NCO-content of 6.88 weight percent (theoretical value: 6.85 weight percent) was found. After cooling to 50° C., the prepolymer was directly neutralized with 90 equivalent % triethyl amine.

160.00 g of prepolymer was then dispersed with intensive stirring into 110.77 g demineralized water and subsequently chain-extended with 80 equivalent % of ethylene diamine resulting in the polyurethane dispersion.

A stabile polyurethane dispersion was obtained with the following characteristics:

| | |
|---|---|
| Appearance | milky white fluid |
| Solid matter content | approx. 60 weight percent |
| pH | 6.90 |
| Brookfield Viscosity | 40 mPa · s (20° C.) |
| Average Particle Size | 339 nm |

Example A.2

Solvent-free Polyurethane Dispersion with High Solid Matter Content Based on a Polycarbonate Polyol of 2,000 Dalton Molecular Mass In a four-necked flask fitted with a stirrer, reflux condenser, thermometer, and nitrogen inlet, a mixture of 100.00 g of polycarbonate polyol with an hydroxy number of 51.1 mg KOH·g$^{-1}$ (trade name Desmophen C 200 by Bayer) and 47.09 g isophorondiisocyanate (trade name Vestanat IPDI of Hüls) was stirred for two hours at 80° to 90° C. under a nitrogen atmosphere.

After addition of 7.50 g finely ground dimethylol propionic acid (trade name DMPA of Mallinckrodt) to the pre-adduct, the mixture was stirred again at 80° to 90° C. under nitrogen until a calculated NCO content was obtained (NCO/OH=2.00). The course of the reaction was acidimetrically recorded. Upon completion of the polyaddition reaction, a NCO-content of 5.76 weight percent (theoretical value: 5.79 weight percent) was found. After cooling to 50° C., the prepolymer was directly neutralized with 90% equivalent triethyl amine.

155.00 g of prepolymer was then dispersed with intensive stirring into 106.62 g demineralized water and subsequently chain-extended with 80 equivalent % of ethylene diamine resulting in the polyurethane dispersion.

A stabile polyurethane dispersion was obtained with the following characteristics:

| | |
|---|---|
| Appearance | milky white liquid |
| Solid matter content | approx. 60 weight percent |
| pH | 7.0 |
| Brookfield Viscosity | 6 mPa · s (20° C.) |
| Average Particle Size | 232 nm |

Example A.3

Solvent-free Polyurethane Dispersion with High Solid Matter Content Based on Polypropylene Glycol 2000

A mixture of 100.00 g of polypropylene glycol with a hydroxy number of 56.1 mg KOH·g$^{-1}$ (trade name Voranol P2000 of Dow) and 35.49 g isophorondiisocyanate (trade name Vestanat IPDI of Hüls was stirred in a four-necked flask fitted with a stirrer, reflux condenser, thermometer, and nitrogen inlet for two hours at 80° to 90° C. under a nitrogen atmosphere. After addition of 4.00 g of finely ground dimethylol propionic acid (trade name DMPA of Mallinckrodt) to the pre-adduct, the mixture was stirred under nitrogen at 80° to 90° C. until the calculated NCO content was attained (NCO/OH=2.00). The course of the reaction was acidimetrically charted. Upon completion of the polyaddition reaction, a NCO-content of 4.86 weight percent (theoretical value: 4.81 weight percent) was found.

After cooling to 50° C., the prepolymer was directly neutralized with 90% equivalent triethyl amine.

140.00 g of prepolymer was then dispersed with intensive stirring into 95.85 g demineralized water and subsequently chain-extended with 80 equivalent % of ethylene diamine resulting in the polyurethane dispersion.

A stabile polyurethane dispersion was obtained with the following characteristics:

| | |
|---|---|
| Appearance | milky white liquid |
| Solid matter content | approx. 60 weight percent |
| PH | 7.41 |
| Brookfield Viscosity | 75 mPa · s (20° C.) |
| Average Particle Size | 309 nm |

FORMULATION EXAMPLES B.1 THROUGH B.9

Stated percentages relate to corresponding weight percentages.

Example B.1

Bonding Agent for Elastic Layers

| | | |
|---|---|---|
| (1) | 46.9% | polyurethane dispersion A.1 |
| (2) | 51.3% | polyurethane dispersion A.2 |
| (3) | 0.5% | de-aerating agents (mixture of foam destroying polysiloxanes) |
| (4) | 1.0% | cross-linking agent (silicon tenside) |
| (5) | 0.3% | polyurethane thickener |

All components are liquid and are mixed in the sequence given above. After addition of PU thickener, dispersion occurs at a slow rate of shear, until an increase in viscosity of the system is no longer registered.

| | |
|---|---|
| Properties: | |
| Viscosity at 20° C.: | 4000 mPas |
| Tensile strength of film: | 22 N/mm$^2$ |
| Elongation at break of film: | 500% |
| Tearing strength of film: | 30 N/mm$^2$ |

Typical values of a conventional 1 K-bonding agent (e.g. Conipur 322): 4,000 mPas; 15 N/mm$^2$, 400%

Example B.2

Adhesion Promoter

| | | |
|---|---|---|
| (1) | 70.0% | polyurethane dispersion A.1 |
| (2) | 27.0% | demineralized water |
| (3) | 2.0% | cross-linking agent (silicon tenside) |
| (4) | 0.5% | de-aerating agents (mixture of foam-destroying polysiloxanes) |

All components are liquid and are mixed in the sequence given above. Dispersion occurs at a slow rate of shear.

Properties:

Viscosity at 20° C.: 40 mPas

Example B.3

Structural Spray Coat (Type 1)

| | | |
|---|---|---|
| (1) | 71.5% | polyurethane dispersion A.1 |
| (2) | 0.6% | cross-linking agent (silicon tenside) |
| (3) | 0.5% | dispersion additive (copolymer with groups having affinity for pigments) |
| (4) | 0.3% | de-aerating agents (mixture of foam destroying polysiloxanes) |
| (5) | 24.0% | filler material (calcium carbonate) |
| (6) | 2.0% | pigment (iron oxides) |
| (7) | 1.0% | pyrogenic silicic acid |
| (8) | 0.1% | polyurethane thickener |

Liquid components (1) through (4) are charged and homogenized for five minutes. Subsequently, (5), (6), and (7) are dispersed into the above at a high rate of shear. After ten minutes, (8) is added and dispersed until the final viscosity is achieved. The temperature of this formulation must never exceed 40° C.

| Properties: | |
|---|---|
| Viscosity at 20° C.: | 3,000 mPas |
| Tensile strength of film: | 16 N/mm² |
| Elongation at break of film: | 300% |
| Tearing strength of film: | 25 N/mm² |

Typical values of a conventional 1K-spray coating (e.g. Conipur 217) or 2K-spray coating (e.g. Conipur 216):

1,000 mpas; 8 N/mm², 400%

Example B.4

Structural Spray Coat (Type 2)

Alternatively, this formulation may be formulated ready-made, i.e. already mixed with the spray granules otherwise added on location, which greatly simplifies the handling at the construction site. This requires only a short homogenizing of the mixture prior to its application.

| (1) | 42.8% | polyurethane dispersion A.1 |
|---|---|---|
| (2) | 0.4% | cross-linking agent (silicon tenside) |
| (3) | 0.3% | dispersion additive (copolymer with groups having affinity for pigments) |
| (4) | 0.2% | de-aerating agents (mixture of foam destroying polysiloxanes) |
| (5) | 14.4% | filler material (calcium carbonate) |
| (6) | 1.2% | pigment (iron oxides) |
| (7) | 0.6% | pyrogenic silicic acid |
| (8) | 0.1% | polyurethane thickener |
| (9) | 40.0% | EPDM granulate with a grain size of 0.5 to 1.5 mm |

Formulation of basic components (1) through (8) follows the method described in Example B.3. Rubber granulate (9) is then carefully stirred into the finished formulation.

Example B.5

Flow Coat

| (1) | 65.7% | polyurethane dispersion A.1 |
|---|---|---|
| (2) | 1.0% | cross-linking agent (silicon tenside) |
| (3) | 0.5% | dispersion additive (copolymer with groups) having affinity for pigments) |
| (4) | 0.3% | de-aerating agents (mixture of foam destroying polysiloxanes) |
| (5) | 30.0% | filler material (mica) |
| (6) | 2.0% | pigment (iron oxides) |
| (7) | 0.5% | pyrogenic silica acid |

Liquid components (1) through (4) are charged and homogenized for five minutes. While stirring, (5), (6), and (7) are added. The mixture is dispersed for twenty minutes during which the temperature must not exceed 40° C.

| Properties: | |
|---|---|
| Viscosity at 20° C.: | 2,700 mPas |
| Tensile strength of film: | 13 N/mm² |
| Elongation at break of film: | 250% |
| Tearing strength of film: | 35 N/mm² |

Typical values for a conventional 2 K flow coating (e.g. Conipur 210):

3,600 mPas (mixture); 2 N/mm², 150%

Example B.6

Filler Material

| (1) | 58.5% | polyurethane dispersion A.1 |
|---|---|---|
| (2) | 0.2% | dispersion additive (copolymer with groups having affinity for pigments) |
| (3) | 0.4% | de-aerating agents (mixture of foam destroying polysiloxanes) |
| (4) | 37.7% | filler material (barite) |
| (5) | 2.0% | pigment (iron oxides) |
| (6) | 1.0% | pyrogenic silicic acid |
| (7) | 0.2% | polyurethane thickener |

Liquid components (1) through (3) are charged and homogenized for five minutes. Then, (5), and following a ten minute interval, (6) and (7) are added into the dispersion at a high rate of shear until the system attains its final viscosity. Throughout this process, the temperature of the formulation must not exceed 40° C.

| Properties: | |
|---|---|
| Viscosity at 20° C.: | thixotropic |
| Tensile strength of film: | 6 N/nm² |
| Elongation at break of film: | 130% |
| Tearing strength of film: | 25 N/mm² |

Typical values of a conventional 2 K filler material (e.g. Conipur 203):

thixotropic; 3.5 N/mm², 80%

Example B.7

Adhesive

| (1) | 60.0% | polyurethane dispersion A.1 |
|---|---|---|
| (2) | 0.5% | cross-linking agent (silicon tenside) |
| (3) | 0.5% | de-aerating agents (mixture of foam destroying polysiloxanes) |
| (4) | 38.9% | filler material (barites) |
| (5) | 0.1% | polyurethane thickener |

Liquid components (1) through (3) are presented/combined (?) and are homogized for five minutes at a low shearing rate.

Then, (4) is added, and dispersed at a high shearing rate for an interval of ten minutes. After adding (5), dispersion is carried out until the final viscosity is achieved. During this process, the temperature of the formulation must not exceed 40° C.

| Properties: | |
|---|---|
| Viscosity at 20° C.: | thixotropic |
| Tensile strength of film: | 6 N/mm$^2$ |
| Elongation at break of film: | 130% |

Example B.8

Sealant for Sports Floor Coverings

Component A

| (1) | 48.7% | polyurethane dispersion A.2 |
|---|---|---|
| (2) | 47.8% | demineralized water |
| (3) | 0.5% | de-aerating agents (mixture of foam destroying polysiloxanes) |
| (4) | 3.0% | matting agents (agglomerated precipitating silicic acid) |
| (5) | 0.4% | polyurethane thickener |

Component B

100% water emulsifiable isocyanate

Formulation elements (1) through (5) are charged and dispersed for twenty minutes at a high shearing rate. The later cross-linking component is added just prior to application of the formulation, stirring moderately (ratio of mixture 100:2). Processing time of the system is approximately forty minutes at 20° C.

| Properties: | |
|---|---|
| Viscosity at 20° C.: | approximately 60 s (DIN 4 mm beaker) |
| Drying/Curing: | dust-dry after approx. 30 minutes, may be walked upon after approx. 16 hours. |

Example B.9

Mixture made of Polyurethane Dispersion and Acrylate Dispersion in Filler Material

| (1) | 65% | polyurethane dispersion A.1 |
|---|---|---|
| (2) | 19% | acrylate/styrene dispersion |
| (3) | 14% | filler material (chalk, mica) |
| (4) | 1% | pigment (e.g. iron oxides) |
| (5) | 0.2% | de-aerating agents (based on silicon) |
| (6) | 0.2% | cross-linking agent |
| (7) | 0.5% | dispersion additive |
| (8) | 0.1% | polyurethane thickener |

| Properties: | |
|---|---|
| Viscosity at 20° C.: | thixotropic |
| Tensile strength of film: | 10 N/mm$^2$ |
| Elongation at break of film: | 600% |

EXAMPLES OF APPLICATIONS C.1 THROUGH C.16

Example C.1

Application as Adhesion Promoter and Bonding Agent for Elastic Layers

| 10 mm water permeable EPDM granulate covering | |
|---|---|
| Undersurface: | asphalt or concrete |
| 0.2 kg/m$^2$ | adhesion promoter based on PU dispersions according to Example B.2 |
| 9.5 kg/m$^2$ | EPDM granulate, 1 to 4 mm |
| 3.2 kg/m$^2$ | bonding agents based on PU dispersions according to Example B.1 |

After curing of the adhesion promoter applied by rollers or spraying, a mixture of EPDM granulate and bonding agents is thickened into a granulate covering.

Example C.2

Application as Bonding Agent for Rubber Granulate Chippings Coverings

| 35 mm base layer under an artificial lawn | |
|---|---|
| Undersurface: | asphalt or concrete, also unpaved undersurfaces |
| 29.0 kg/m$^2$ | quartz gravel, 3 to 5 mm or clippings, 2 to 5 mm |
| 11.5 kg/m$^2$ | SBR granulate fiber mixture |
| 3.4 kg/m$^2$ | bonding agent based on PU dispersion according to Example B.1 |

Example C.3

Application as Adhesion Promoter and Bonding Agent for Combination Coverings out of Recycling and EPDM Granulate

| 15 mm two-layered combination covering (9 and 6 mm) | |
|---|---|
| Undersurface: | asphalt or concrete |
| 0.2 kg/m$^2$ | adhesion promoter based on PU dispersion according to Example B.2 |
| 5.9 kg/m$^2$ | SBR granulate, 1 to 4 mm |
| 1.9 kg/m$^2$ | bonding agent based on PU dispersion according to Example B.1 |
| 6.0 kg/m$^2$ | EPDM granulate, 1 to 3 mm |
| 1.9 kg/m$^2$ | bonding agent based on PU dispersion according to Example B.1 |

An elastic layer produced analogously to Example C.1 out of SBR granulate is covered with an additional layer out of EPDM granulate.

Example C.4

Application as Spray Coat 13 mm water permeable structural spray coat onto
7 rubber granulate covering

| | |
|---|---|
| Undersurface: | asphalt or concrete |
| 0.2 kg/m² | adhesion promoter (conventional), e.g. Conipur 70 |
| 6.9 kg/m² | SBR granulate, 1 to 4 mm |
| 1.5 kg/m² | polyurethane bonding agent (conventional), e.g. Conipur 322 |
| 1.2 kg/m² | spray coat based on PU dispersions in Example B.3 |
| 0.8 kg/m² | EPDM granulate, 0.5 to 1.5 mm |

In two process cycles, a mixture of spray coat with EPDM granulate of small granule size is sprayed onto rubber granulate covering previously installed and passable (walkable).

Tensile strength: 0.55 N/mm²; elongation at break: 45%

Example C.5

Application as Adhesion Promoter, Bonding Agent, and Spray Coat 13 mm water permeable structural spray coat onto
a rubber granulate covering

| | |
|---|---|
| Undersurface: | asphalt or concrete |
| 0.2 kg/m² | adhesion promoter based on PU dispersions in Example B.2 |
| 6.9 kg/m² | SBR granulate, 1 to 4 mm |
| 2.3 kg/m² | bonding agents based on PU dispersions in Example B.1 |
| 1.2 kg/m² | spray layering based on PU dispersions in Example B.3 |
| 0.8 kg/m² | EPDM granulate, 0.5 to 1.5 mm |

Example C.6

Application as Spray Coat 13 mm water impermeable structural spray coat onto
rubber granulate covering

| | |
|---|---|
| Undersurface: | asphalt or concrete |
| 0.2 kg/m² | adhesion promoter (conventional), e.g. Conipur 70 |
| 6.9 kg/m² | SBR granulate, 1 to 4 mm |
| 1.5 kg/m² | polyurethane bonding agent (conventional), e.g. Conipur 322 |
| 1.5 kg/m² | filler material (conventional), e.g. Conipur 203 |
| 1.2 kg/m² | spray coat based on PU dispersions in Example B.4 |
| 0.8 kg/m² | EPDM granulate, 0.5 to 1.5 mm |

In order to obtain a water impermeable sports floor covering the pores of a rubber granulate covering are sealed with filler material prior to application of the spray coat.

Example C.7

Application as Filler Material and Spray Coat 13 mm water impermeable structural spray coat onto
rubber granulate covering

| | |
|---|---|
| Undersurface: | asphalt or concrete |
| 0.2 kg/m² | adhesion promoter (conventional), e.g. Conipur 70 |
| 6.9 kg/m² | SBR granulate, 1 to 4 mm |
| 1.5 kg/m² | polyurethane bonding agent (conventional), e.g. Conipur 322 |
| 1.5 kg/m² | filler material based on PU dispersions in Example B.6 |
| 1.2 kg/m² | spray coat based on PU dispersions in Example B.3 |
| 0.8 kg/m² | EPDM granulate, 0.5 to 1.5 mm |

Example C.8

Application as Adhesion Promoter, Bonding Agent, Filler Material, and Spray Coat 13 mm water impermeable structural spray coat onto
rubber granulate covering

| | |
|---|---|
| Undersurface: | asphalt or concrete |
| 0.2 kg/m² | adhesion promoter based on PU dispersions in Example B.2 |
| 6.9 kg/m² | SBR granulate, 1 to 4 mm |
| 2.3 kg/m² | bonding agent based on PU dispersions in Example B.1 |
| 1.5 kg/m² | filler material based on PU dispersions in Example B.6 |
| 1.2 kg/m² | spray coat based on PU dispersions in Example B.3 |
| 0.8 kg/m² | EPDM granulate, 0.5 to 1.5 mm |

Example C.9

Application as Flow Coating 13 mm water impermeable flow coat covering onto
rubber granulate covering

| | |
|---|---|
| Undersurface: | asphalt or concrete |
| 0.2 kg/m² | adhesion promoter (conventional), e.g. Conipur 70 |
| 6.5 kg/m² | SBR granulate, 1 to 4 mm |
| 1.4 kg/m² | polyurethane bonding agent (conventional), e.g. Conipur 322 |
| 1.5 kg/m² | filler material (conventional), e.g. Conipur 203 |
| 2.5 kg/m² | flow coat covering based on PU dispersions in Example B.5 |
| 2.5 kg/m² | EPDM granulate, 1 to 4 mm |

To seal a pore, filler material is applied to a previously installed rubber granulate covering upon which it is possible to walk. Upon curing, a flow coat is applied which is dusted while yet liquid with excess EPDM granulate. The amount of EPDM granulate which is not bonded is swept off after curing of the covering, and may be reused.

Example C.10

Application as Filler Material, Flow Coat Covering, and Sealant

| 13 mm water impermeable, sealed flow coat covering on rubber granulate covering | |
|---|---|
| Undersurface: | asphalt or concrete |
| 0.2 kg/m² | adhesion promoter (conventional), e.g. Conipur 70 |
| 6.5 kg/m² | SBR granulate, 1 to 4 mm |
| 1.4 kg/m² | polyurethane bonding agent (conventional), e.g. Conipur 322 |
| 1.5 kg/m² | filler material based PU dispersions in Example B.6 |
| 2.5 kg/m² | flow coat covering based on PU dispersions in Example B.5 |
| 2.5 kg/m² | EPDM granulate, 1 to 4 mm |
| 0.3 kg/m² | Sealant based on PU dispersions in Example B.8 |

After excess EPDM granulate is swept away, a sports floor covering produced analogously to Example C.9 is sealed in two spray cycles.

Tensile strength: 0.90 N/mm², Elongation at break: 62%

Example C.11

Application as Adhesive, Filler Material, and Flow Coat Covering

| 13 mm water impermeable flow coat covering on prefabricated rubber granulate covering | |
|---|---|
| Undersurface: | asphalt or concrete |
| 0.2 kg/m² | adhesion promoter (conventional), e.g. Conipur 70 |
| 1.0 kg/m² | adhesive based on PU dispersions in Example B.7 prefabricated rubber granulate mat, 10 mm |
| 0.5 kg/m² | filler material based PU dispersions in Example B.6 |
| 2.5 kg/m² | flow coat covering based on PU dispersions in Example B.5 |
| 2.5 kg/m² | EPDM granulate, 1 to 4 mm |

After priming the undersurface with an adhesion promoter, a prefabricated rubber granulate mat is glued onto it, pores are sealed using filler material, and in a manner described above, a flow coat covering is applied which is dusted with EPDM granulate.

Example C.12

Application as Flow Coat Covering

| 4 to 5 mm water impermeable, sealed massive covering | |
|---|---|
| Undersurface: | asphalt |
| 3 × 2.0 kg/m² | flow coat covering based on PU dispersions in Example B.5 |
| 0.3 kg/m² | polyurethane sealant (smooth or slip-proof), e.g. Conipur 63 HE, Conipur 64 HE |

The flow coat covering is applied in three cycles and is sealed upon complete curing in two spray/spray cycles.

Example C.13

Application as Filler Material, Flow Coat Covering, and Sealant

| 13 mm water impermeable, sealed flow coat covering on rubber granulate covering | |
|---|---|
| Undersurface: | asphalt |
| 3 × 3.0 kg/m² | flow coat covering based on PU dispersions in Example B.5 |
| 3 × 2.5 kg/m² | filler granulate, 1 to 3 mm |
| 3.0 kg/m² | flow coat covering based on PU dispersions in Example B.5 |
| 2.5 kg/m² | EPDM granulate, 1 to 4 mm |
| 0.3 kg/m² | Sealant based on PU dispersions in Example B.8 |

The flow coat covering is applied in three work cycles, each layer being dusted and swept after each successive curing. A fourth layer of flow coat covering is dusted with EPDM granulate, the excess is removed upon curing, and the surface is sealed in two spray cycles.

Example C.14

Application as Adhesive, Filler Material, and Flow Coat Covering in the Form of a Thin Layering

| | |
|---|---|
| Undersurface: | asphalt or concrete |
| 0.2 kg/m² | adhesion promoter (conventional), e.g. Conipur 70 |
| 1.0 kg/m | adhesive based on PU dispersions in Example B.7 prefabricated rubber granulate mat, 10 mm |
| 0.5 kg/m² | filler material based PU dispersion mass according to Example B.6 (sealing of pores) |
| 0.6 kg/m² | filler material based PU dispersion mass according to Example B.6 (doctoring; followed by roller structuring) |
| 150 g/m² | flow coat covering based on PU dispersions in Example B.5 |

Example C.15

Application as Filler Material and Flow Coat Covering in the Form of a Thin Layer

| | |
|---|---|
| Undersurface: | asphalt or concrete |
| 0.2 kg/m² | adhesion promoter (conventional), e.g. Conipur 70 |
| 6.5 kg/m | SBR granulate |
| 1.4 kg/m | polyurethane bonding agent (conventional), e.g. Conipur 322 |
| 1.5 kg/m | filler material based on a PU dispersion mass according to Example B.6 (sealing of pores) |
| 0.6 kg/m² | filler material based PU dispersion mass according to Example B.6 (doctoring; followed by roller structuring) |
| 150 g/m² | flow coat covering based on PU dispersions in Example B.5 |

Example C.16

Application as Filler Material and Spray Coat

| 13 mm water impermeable structural spray coat on rubber granulate covering | |
|---|---|
| Undersurface: | asphalt or concrete |
| 0.2 kg/m² | adhesion promoter (conventional), e.g. Conipur 70 |
| 6.9 kg/m² | SBR granulate, 1 to 4 mm |
| 1.5 kg/m² | polyurethane bonding agent (conventional), e.g. Conipur 322 |
| 1.5 kg/m² | filler material based PU dispersions and acrylate/styrene dispersions in Example B.9 |
| 1.2 kg/m² | spray coat based on PU dispersions in Example B.3 |
| 0.8 kg/m² | EPDM granulate, 0.5 to 1.5 mm |

The invention claimed is:

1. A method for making sports floor coverings comprising applying a formulation to a surface, said formulation comprising aqueous, isocyanate free polyurethane dispersions, wherein said dispersions have a solid matter content of ≧30 percent by weight and a solvent content of ≦10 percent by weight and wherein the polyurethane polymers of said dispersions have a number average molecular mass of 25,000 to 100,000 Daltons, and are obtained from polyols and polyisocyanates having an NCO/OH equivalent ratio of 1.5 to 2.5;

wherein said dispersions are produced by a production method comprising the steps of:

a) reacting 10-50 wt % of higher number average molecular weight polyol component (A) (i) having two or more hydroxyl groups reactive with polyisocyanates and a molecular weight of 250 to 20,000 Daltons, and optionally 0.50-5 wt % lower number average molecular weight polyol component (A) (ii) having two or more hydroxy groups reactive with polyisocyanates and having a molecular weight of 60 to 250 Daltons with 5-25 wt % of polyisocyanate component (B), consisting of at least one polyisocyanate homolog with two or more aliphatic or aromatic isocyanate groups, optionally in the presence of a catalyst, to create a polyurethane pre-adduct, then b) reacting the polyurethane pre-adduct of step a) with 0.5-5 wt % of lower number average molecular weight and anionic modifiable polyol component (A) (iii) having two or more hydroxy groups reactive with polyisocyanates and one or more carboxy groups inert with respect to polyisocyanates, which in the presence of base may be completely or partially converted into carboxylate groups, to produce the corresponding prepolymer, c) reacting the prepolymer of step b) with 0.25-2.5 wt % of a neutralizing component (C) for the complete or partial neutralization of the carboxy groups, followed by or simultaneous with d) dispersing the neutralized prepolymer of step c) in 10-60 wt % water, which optionally contains 10-70 wt % of formulation component (F) consisting of filler material, pigments, softeners, fiber materials, and other common additives, following which e) reacting the dispersion of step d) with 0.25-2.5 wt % chain extension component (D) consisting of at least one diamine with two amino groups reactive with polyisocyanate, and f) optionally reacting the dispersion of step e) with 0.05-0.5 wt % of chain stopping component (E) consisting of at least one monoamine with an amino group reactive with polyisocyanate, wherein the wt % values in steps (a)-(f) are based on the overall weight of said dispersions produced.

2. A method according to claim 1, wherein said dispersions have a solid matter content ranging from 40 to 70 percent by weight.

3. A method according to claim 1, wherein said dispersions have a solvent content of less than 5 percent by weight.

4. A method according to claim 1, wherein said dispersions are solvent free.

5. A method according to claim 1, wherein the polyurethane polymers of said dispersions form micelles having an average particle size of from 100 to 500 nm.

6. A method according to claim 1, wherein said polyurethane dispersion acts as a bonding agent for elastic layers comprising rubber granulates or fibers as well as optionally additives.

7. A method according to claim 1, wherein said polyurethane dispersion acts as an adhesion promotor, said adhesion promotor being applied to an undersurface of a floor covering.

8. A method according to claim 1, wherein said polyurethane dispersion acts as a primary coat being applied to an undersurface of a sports floor covering.

9. A method according to claim 1, wherein said polyurethane dispersion acts as a spray coat, said spray coat being applied to an elastic or stiff undersurface.

10. A method according to claim 9, wherein said polyurethane dispersion contains a structural filler material.

11. A method according to claim 9, wherein said polyurethane dispersion contains 0.1 to 1.0 weight percent of UV stabilizers based on sterically hindered amines relative to the total weight of the formulation.

12. A method according to claim 1, wherein said polyurethane dispersion acts as a flow coat, said flow coat being applied to an elastic or stiff undersurface.

13. A method according to claim 10, wherein said polyurethane dispersion contains 0.1 to 1.0 percent by weight of UV stabilizers based on sterically hindered amines relative to the total weight of the formulation.

14. A method according to claim 1, wherein said polyurethane dispersion is applied as filler material to seal pores of undersurfaces of sports floor coverings.

15. A method according to claim 1, wherein said polyurethane dispersion is applied as an adhesive to glue prefabricated elastic layers.

16. A method for sealing sports floor coverings comprising applying a formulation according to claim 1, optionally together with pigments.

17. A method according to claim 16, wherein said polyurethane dispersion contains 0.1 to 1.0 percent by weight of UV stabilizers based on sterically hindered amines relative to the total weight of the formulation.

18. A method according to claim 1, wherein said dispersions are applied to elastic or stiff undersurfaces in layers having a total thickness of 0.1 to 50 mm.

19. A method for applying said polyurethane dispersion according to claim 1 in quantities of 0.1 to 10.0 kg per m2 of surface to be covered per work cycle.

20. A method according to claim 1 wherein the polyurethane dispersion is a one-component formulation.

* * * * *

UNITED STATES PATENT AND TRADEMARK OFFICE
CERTIFICATE OF CORRECTION

PATENT NO. : 7,255,897 B2  Page 1 of 1
APPLICATION NO. : 09/768274
DATED : August 14, 2007
INVENTOR(S) : Temme et al.

It is certified that error appears in the above-identified patent and that said Letters Patent is hereby corrected as shown below:

On The Title Page
1. Please Delete:

Item
"(54) USE OF AQUEOUS POLYURETHANE DISPERSIONS IS FORMULATIONS FOR SPORTS FLOOR COVERINGS"

And Replace With:

Item
-- (54) USE OF AQUEOUS POLYURETHANE DISPERSIONS IN FORMULATIONS FOR SPORTS FLOOR COVERINGS --

2. Column 1, Line 2, Please Delete:

"DISPERSIONS IS FORMULATIONS FOR"

And Replace With:

-- DISPERSIONS IN FORMULATIONS FOR --

Signed and Sealed this

Thirteenth Day of November, 2007

JON W. DUDAS
*Director of the United States Patent and Trademark Office*